United States Patent [19]

Maynard et al.

[11] E Re. 28,522

[45] Reissued Aug. 19, 1975

[54] APPARATUS FOR A RIGID ROAD WHICH HAS A TEXTURED SURFACE

[75] Inventors: David Payne Maynard, Slough; John Weaver, Beaconsfield, both of England

[73] Assignee: The Cement and Concrete Association Terminal House, London, England

[22] Filed: Apr. 12, 1974

[21] Appl. No.: 460,476

Related U.S. Patent Documents

Reissue of:

[64] Patent No.: 3,683,762
Issued: Aug. 15, 1972
Appl. No.: 63,867
Filed: Aug. 14, 1970

[30] Foreign Application Priority Data

Aug. 15, 1969 United Kingdom..... 40,840/69

[52] U.S. Cl. ..... 404/93
[51] Int. Cl. ..... E01c 23/16
[58] Field of Search..... 404/75, 89, 83

[56] References Cited

UNITED STATES PATENTS

| | | | |
|---|---|---|---|
| 2,042,156 | 5/1936 | McCrery | 404/114 |
| 2,244,742 | 6/1941 | Tyson | 299/1 |
| 2,261,766 | 11/1941 | Jackson | 404/114 |
| 2,643,595 | 6/1953 | Jackson | 404/113 |
| 3,377,932 | 4/1968 | Atkinson | 404/51 |
| 3,516,339 | 6/1970 | Perkins | 404/75 |
| 3,516,340 | 6/1970 | Perkins | 404/75 |
| 3,801,211 | 4/1974 | Perkins | 404/75 |

*Primary Examiner*—Nile C. Byers, Jr.
*Attorney, Agent, or Firm*—Berman, Bishoff & Platt

[57] ABSTRACT

A profile beam having a working surface constituted by alternate ridges and grooves is drawn, while being vibrated and whilst while to the application of a uniform downwardly directed force, across the surface of cement which has been laid to form a road, airplane runway or the like and which is still plastic, whereby parallel grooves are formed in said cement by the ridges. The grooves, which constitute the texture applied to the road surface, may extend at right angles to the traffic flow direction and will in that case be parallel to one another throughout or may make an angle of less than 90° with the traffic flow direction.

14 Claims, 6 Drawing Figures

6 Sheets-Sheet 1

INVENTOR.
DAVID PAYNE MAYNARD,
BY JOHN WEAVER
Berman, Davidson & Berman,
ATTORNEYS.

INVENTOR.
DAVID PAYNE MAYNARD,
JOHN WEAVER
BY Berman, Davidson & Berman,
ATTORNEYS.

INVENTOR.
DAVID PAYNE MAYNARD,
JOHN WEAVER
BY Berman, Davidson & Berman,
ATTORNEYS.

INVENTOR.
DAVID PAYNE MAYNARD,
JOHN WEAVER
BY Berman, Davidson & Berman,
ATTORNEYS INVENTOR.
DAVID PAYNE MAYNARD,
JOHN WEAVER
BY Berman, Davidson & Berman,
ATTORNEYS.

INVENTOR.
DAVID PAYNE MAYNARD,
JOHN WEAVER
BY Berman, Davidson & Berman,
ATTORNEYS.

APPARATUS FOR A RIGID ROAD WHICH HAS A TEXTURED SURFACE

Matter enclosed in heavy brackets [ ] appears in the original patent but forms no part of this reissue specification; matter printed in italics indicates the additions made by reissue.

---

This invention relates to a method of and apparatus for making pavements for roads, runways and similar sites which have textured surfaces.

Texturing of the surfaces of rigid roads has been carried out for a great number of years by brushing the surface of the concrete with horse-hair, bass or steel tape bristled brooms before the concrete has hardened. Such brushing has the effect of roughening what might otherwise be too smooth a surface.

It is now known from field tests which have been made in the United Kingdom by the Association with the co-operation of the United Kingdom Ministry of Transport, the Road Research Laboratory in the United Kingdom and the Country Council of Hertfordshire, England that certain patterns or dispositions of grooves formed in the surface of a worn rigid road markedly improve the skidding resistance of that surface. Thus, wide grooves in such a surface which are parallel to one another and which extend transversely will respect to the general direction of flow of the traffic (hereinafter referred to as "the traffic flow direction" in the interests of brevity) have been found to give good results, as also have parallel grooves in two sets of which the grooves of one set cross those of the other set, each groove making an angle of substantially 45° with a line which is parallel to the traffic flow direction.

One method of formation of these grooves in the worn surfaces of existing rigid roads is to cut said grooves therein using powered machinery having diamond-impregnated steel blades. Other methods have involved the use of machinery which has included cutting heads which comprise silicon carbide blades or flails attached to drums which are rotated about horizontal axes. While such methods may well be the only feasible methods by means of which worn surfaces of rigid roads can be re-textured in order to avoid the expense of and the traffic dislocation caused by removal of the worn pavement and the laying of new concrete pavement, it is considered to be undesirable to texture in such a laborious and expensive manner the surface of any road which is either new or being repaved.

The principal objects of the present invention are to provide a method of texturing the surface of a rigid road and an apparatus operable to carry said method into effect, said method being free from or substantially free from the disadvantages mentioned.

Accordingly, from one aspect, the present invention consists in a method of making a textured-surface rigid road, which method includes the following steps, namely, floating a vibrating groove-forming profile beam across the surface of concrete which has been laid to the depth required for the finished road and which is still in a plastic state in order to form at least one groove at a time in the surface of said plastic concrete and thereafter permitting or causing said concrete to harden, whereby a rigid road having a textured surface is formed.

In one embodiment of said method, said beam is floated across said concrete in a first direction of traverse to form said one groove or set of grooves in said surface and is then moved in a direction which is parallel or substantially parallel to the traffic flow direction before being floated in a second direction of traverse opposite to said first direction of traverse to form another groove or set of grooves in said surface.

The angle which each of said first and second directions of traverse makes with the traffic flow direction may be widely varied to form a textured surface in accordance with the specification laid down by the authority concerned. Thus, said first and second directions of traverse may be normal to said traffic flow direction, the grooves formed being parallel to one another and such as can be formed by a single profile beam. Alternatively, each of two profile beams spaced apart from one another along said traffic flow direction may be floated across said concrete surface in said first and second directions of traverse, the directions of traverse of one of said profile beams crossing the directions of traverse of the other of said profile beams symmetrically or asymmetrically with respect to said traffic flow direction.

It is thought at present that the concrete should be allowed to stand for a period of time after the instant of finishing the surface by the concrete paving machine before the profile beam or either of the profile beams is floated across said surface to form said groove or set of grooves therein. This standing period will be governed to some extent by the water content of the concrete mix, its workability and its rate of setting, which is determined to a large extent by the type of cement and ambient conditions and will also be governed by the length of the train constituting the pavement laying machine. A typical train consists of a spreader, a leveller, a compacting machine, and a finishing machine. An apparatus capable of carrying the method according to the present invention into effect will come after the finishing machine and this will mean, in general, a lapse of time of, say, 45 minutes between the spreading and surface-texturing operations.

Said methods may include the further step of cleaning the working surface of said profile beam after a predetermined number of traverses have been made thereby. Preferably, cleaning will be effected only after completion by the profile beam of movement in one of said first and second directions of traverse.

From another aspect, the present invention consists in apparatus operable to carry into effect said method of making a textured-surface rigid road, said apparatus including a profile beam which has a groove-forming working surface and a carriage which is movable upon a supporting gantry which is in turn movable along the traffic flow direction, said profile beam being operatively connected to a vibrator and being adjustably suspended from said carriage, the arrangement being such that, if said gantry were to be so positioned as to span a surface of concrete which has been laid to the depth required for the finished road and which is still in a plastic state and if said working surface of the profile beam were to be placed in contact with the surface of said concrete and if said carriage were to be moved upon said supporting gantry while said profile beam was being vibrated by said vibrator, the working surface of the profile beam would be floated across the surface of said concrete and would form therein at least one groove, the manner of suspension of said profile beam not only being such that whatever effective load were predetermined by adjustment thereof before said movement of the carriage would be applied to said plastic concrete while said working surface and the surface of said plastic concrete were in mutual contact but also being such that the moving profile beam would assume an attitude in which the leading edge thereof would be higher than the trailing edge thereof in relation to the plane containing the surface of the plastic concrete before the formation therein of any groove.

In the preferred embodiment of said apparatus, said profile beam is suspended upon constant force spring means; such means could be constituted by a number of "Tensator" springs. "Tensator" is a trademark utilized by Tensator Ltd., a British manufacturer located in Newport Pagnell, Bucks County, England. The particular "Tensator" springs disclosed in the drawing of this application are ribbons of specially treated spring material having a coiled portion and a straight portion and which yield substantially constant tensile force no matter how much of each ribbon is unwound from the coil portion.

Said vibrator is preferably mounted upon said profile beam.

In the preferred embodiment of the apparatus, the working surface of said profile beam consists of downwardly directed parallel ridges which define parallel troughs, those marginal portions of the beam which extend in directions normal or substantially normal to the parallel ridges being canted upwardly towards said gantry so as to reduce the incidence of said marginal portions digging into and ploughing up said plastic concrete. Said ridges are preferably of square or rectangular section.

Said profile beam will preferably be made out of a solid block of metal because, when said profile beam is constituted by or includes a plate to which square-section rods have been fixed in parallel relationship to form the groove-forming ridges, it has been found that there is a tendency for particles of said plastic concrete to penetrate between said rods and said plate.

Preferably, cleaning means will be provided on the gantry operable to remove from the working surface of said beam at least the major proportion (if not all) of any adherent particles of said plastic concrete in order to prevent any accretion thereof on said working surface.

The carriage is, in one embodiment of said apparatus, driven by said reversible motor through chains and sprockets keyed to transverse shafts carrying guide wheels whose single circumferential flanges extend into a straight guide slot.

An apparatus according to the present invention could be constructed as a self-contained vehicle intended for power-assisted travel along, for example, parallel rails either under the control of a driver or operator or under the control of a program-operated device. Alternatively, an apparatus according to the present invention could be constructed as an ancillary part of a concrete paving machine or train, said apparatus being connected to such machine or train by means of one or more cables, hawsers or the like which, in conjunction with intermittently but synchronously-operated winches on said apparatus, would enable said apparatus to follow the paving machine at the requisite spacing to permit the laid concrete to stand for the period of time considered to be desirable before groove formation in the plastic concrete is effected.

The present invention will now be more particularly described with reference to the accompanying drawings, in which.

Figure 1:
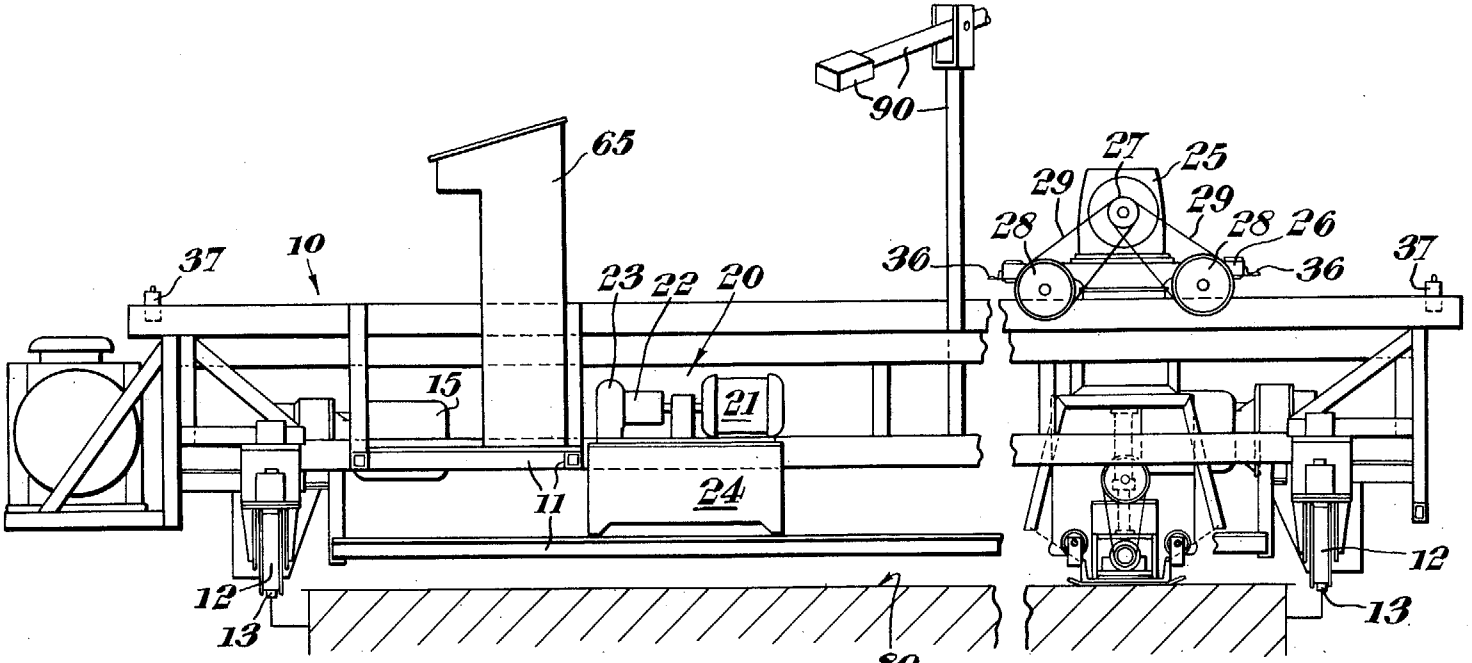
FIG. 1 illustrates in side elevation one embodiment of an apparatus operable to make a textured-surface rigid road in accordance with the method of making such a road disclosed herein.
Figure 2:
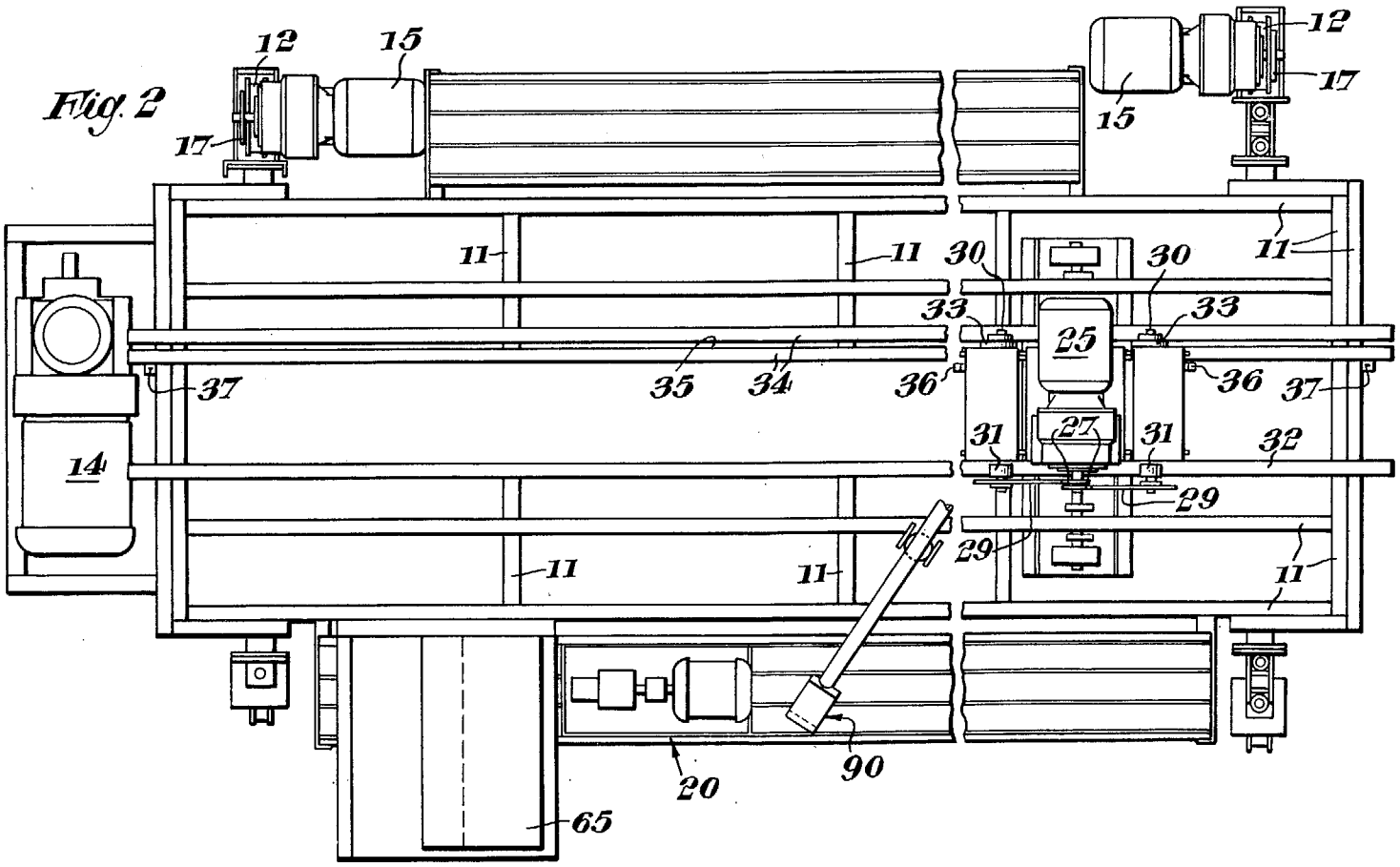
FIG. 2 illustrates said apparatus in top plan view.
Figure 3:
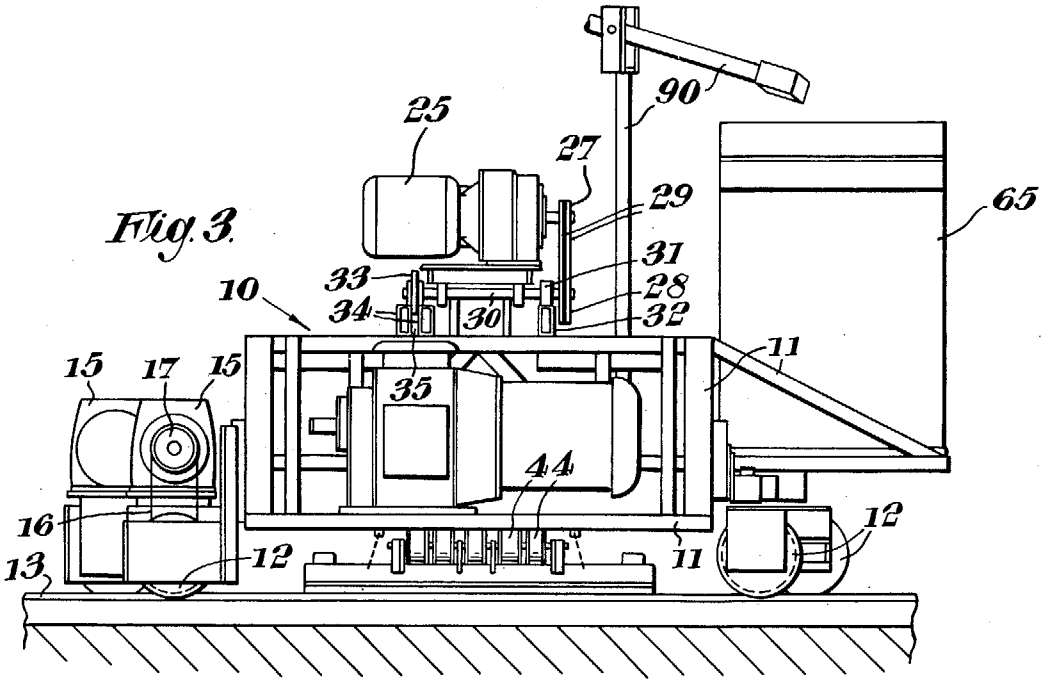
Figure 4:
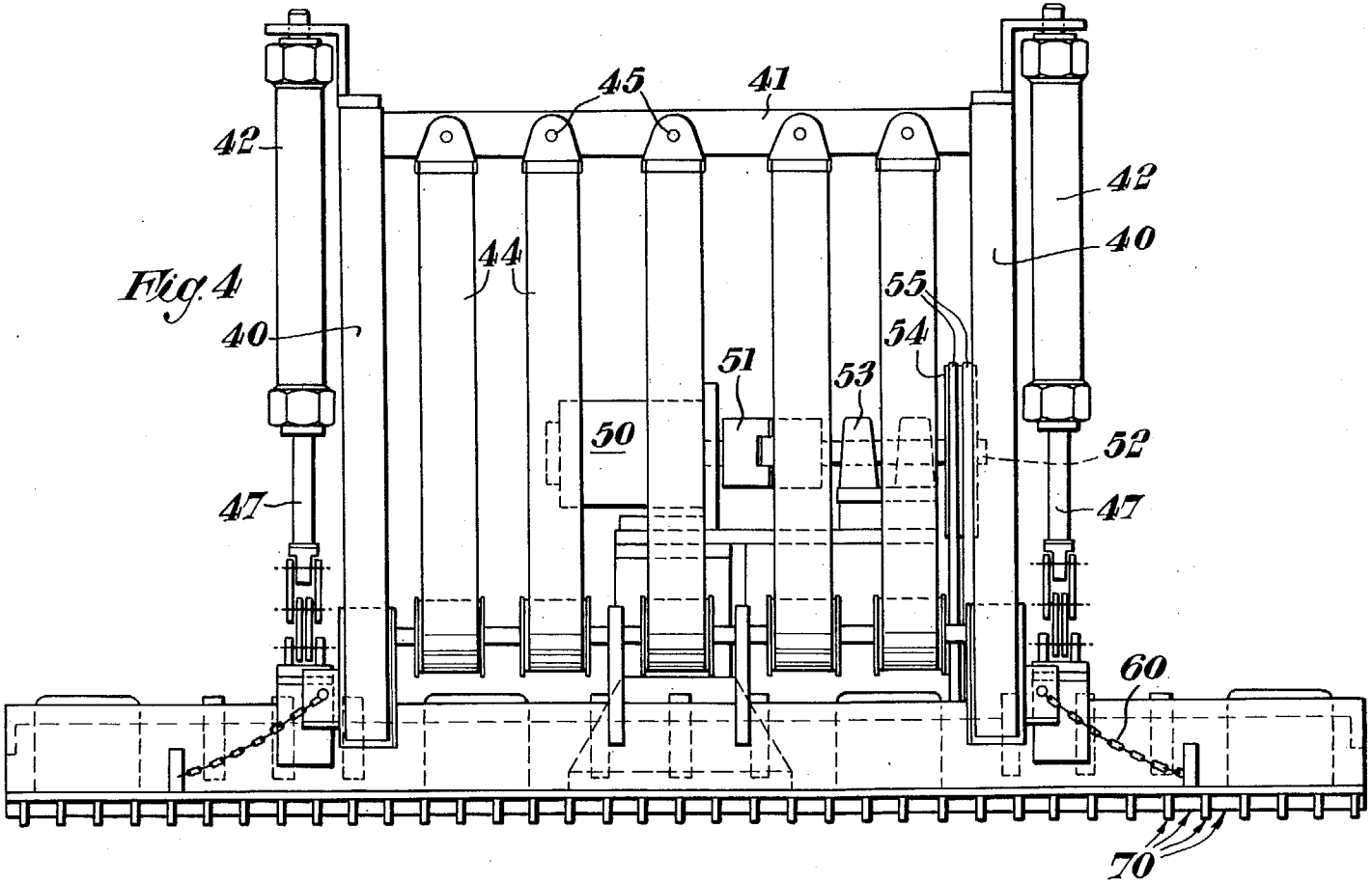
Figure 5:
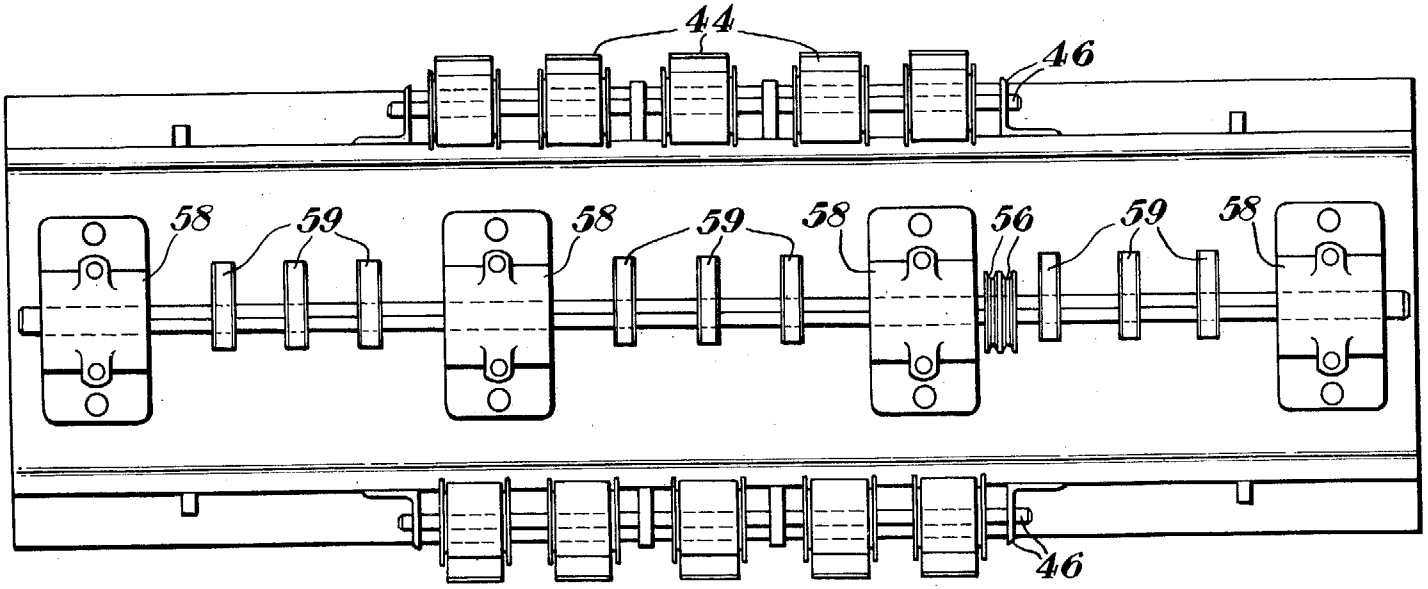
Figure 6:
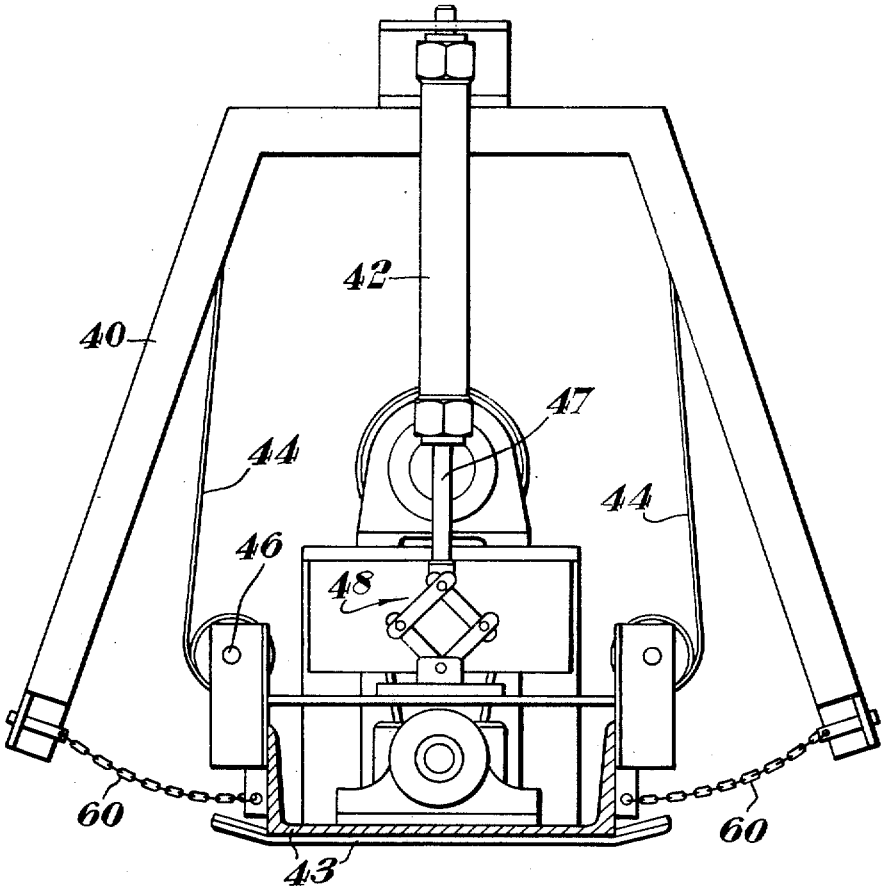

FIG. 3 illustrates in end elevation the apparatus shown in FIG. 1, said elevation being of the left-hand end of the apparatus shown in FIG. 1; and FIGS. 4, 5 and 6 illustrate detail views on a larger scale than that of FIGS. 1 to 3, of the traversible and vibratable groove-forming profile beam which is adjustably suspended in said apparatus and constitutes the essential component of the apparatus, said views representing, respectively, side elevation, a top plan, and an end elevation of said beam.

The apparatus illustrated in the drawings consists essentially of a gantry 10 which is made from box-section steel members 11 appropriately secured to one another to form a rigid frame, the gantry being supported by flanged wheels 12 which are mounted upon the gantry and which are intended to run on rails 13 which would extend alongside the formwork within which the concrete to be laid on the subgrade. Some or all of said wheels 12 may be articulated, for example may be castor wheels.

The gantry 10 supports at one end a generating set 14 operable to supply the electric power necessary to drive a plurality of electric motors. Two electrically driven geared drive units 15 are mounted upon the gantry 10 and are operable to drive the two wheels 12 with which they are associated, the drive being by way of endless chain 16 and sprocket wheels 17 or some similar arrangement. The two drive units or motors 15 are both variable speed and reversible.

An hydraulic power pack 20 includes an electric motor 21, an hydraulic pump 22, a relief valve gauge 23 and a reservoir 24.

An electrically operated geared drive unit 25 is mounted upon a carriage 26, the output shaft of the unit have toothed sprockets 27 thereon which drive toothed sprockets 28 by way of endless chains 29, the sprockets 28 being keyed to parallel axles 30 which are rotatably connected to the carriage. The axles 30 carry rollers 31 which are in contact with a rail 32 and also carry guide wheels 33 which, coacting with parallel guide rails 34 which between them define a rectilinear slit 35, provide guided traverse of the carriage 26 which is moved when the motor 25 causes the rollers 31 to rotate in contact with the rail 32. The motor 25 is variable speed and reversible. The carriage 26 carries tripping members 36 and limit switches 37 are mounted on one of the guide rails 34.

Connected to the carriage 26 for movement therewith is an assembly which includes two substantially A-shaped beams 40 which are connected to one another by a longitudinal beam 41, two double-acting hydraulic cylinders 42 which are mounted upon said beams at the opposite ends of said beam 41 in the vicinities of the beams 40, a profile beam 43, a plurality of constant force springs 44 each of which is connected at 45 to the beam 41 and at 46 to the beam 43, the cylinders 42 having stems 47 whose free ends are connected to said beam 43 by way of a parallel-motion or scissors linkage 48.

Mounted on the profile beam 43 is an hydraulic motor 50 which is variable speed and reversible, the output shaft of said motor being connected by way of a shaft coupling 51 to a drive shaft 52 which is supported for rotation in two opposite directions of rotation in a journal box 53. Adjacent the free end of said shaft 52 is keyed a driving pulley 54 which is drivingly connected by driving belts 55 to a driven pulley 56 which is keyed to a vibrating shaft 57, said shaft 57 being supported by and running in pillow block bearings 58 which are carried by the profile beam 43. Keyed to the shaft 57 are spaced eccentrically mounted masses 59 which, when the shaft 57 is rotated by the drive from the motor 50, will cause the entire profile beam to vibrate.

The profile beam 43 is connected to the lower and free ends of the two beams 40 by guide chains 60.

The gantry 10 also supports a control console 65 into which are brought all electrical and hydraulic lines, whereby the operation of the apparatus can be conveniently controlled.

The operation of the apparatus is considered to be self-evident and it will, therefore, suffice to point out that the working surface 70 of the profile beam 43, consisting of alternate parallel ridges and troughs, will form parallel grooves in the plastic concrete when the carriage 26 is caused to traverse the formation by riding along the rails 32, 34, the formation of said grooves being assisted by the vibration produced by rotation of the shaft 57 to which the eccentric masses 59 are keyed. At the end of each traverse, the profile beam 43 is lifted out of contact with the concrete by appropriate operation of the hydraulic actuators 42, said beam 43 thereafter being lowered again under the control of said hydraulic actuators into contact with the concrete after the gantry 10 has been moved in the requisite direction along the rails 13 by the powered wheels 12, whereupon the carriage 26 is caused to traverse the formation in the opposite direction of travel thereof to that previously effected. The limit switches 37 are tripped by the members 36 to stop the respective traverse of the carriage and also to stop the hydraulic motor 50.

The profile beam is lowered by means of the hydraulic pistons onto the surface of the concrete pavement in which position the scissors linkages release any load carried by the pistons. The profile beam floats on the surface of the concrete with part of the mass of the beam supported by the constant force or "Tensator" springs. The proportion of the mass carried by the springs obviously may be controlled by selecting a spring or springs having the desired tension characteristics or by adding or subtracting springs, to accommodate variations in the consistency of the concrete. Variations in the consistency of the concrete can also be accommodated by changes in the frequency of the applied vibration, which fluidizes the concrete and the speed of traverse of the profile beam.

Again, the wheels 12 which are shown as being powered by the motors 15 in the drawings need not be so powered because the apparatus could form the terminal part of a train of pavement-laying machinery, being connected thereto by cables, hawsers or the like, which (in conjunction with intermittently-operated but synchronously-operated winches) would enable the apparatus to follow the preceding constituent elements of said machine at the end of each traverse of the carriage 26.

If cleaning means operable to keep the working surface 70 of the profile beam 43 are provided (for example brushes, pressurized fluid jets and so on, possibly in combination with one another), it would be desirable to extend the gantry 10 to an extent sufficient to ensure that any adherent material on said working surface would not fall on the surface of the concrete which has been or which is to be textured. Thus, the gantry 10 might be lengthened to the right as seen in FIG. 1 and cleaning would be effected at the end of alternate traverses.

The parallel ridges and troughs constituting said working surface are preferably formed by working a solid block or plate. The creation of said ridges by securing parallel square-section rods to a plate is likely to give rise to trouble because there is a tendency for particles of the plastic concrete to penetrate between the rods and the plate. These particles become impossible to remove on site and lead to buckling or deformation of the rods, said buckling or deformation giving rise to variations in depth of groove in the concrete.

As will be seen best in FIGS. 1 and 6, the leading/-trailing edges of the beam 43 are located above the surface 80 of the plastic concrete. This canting upwardly of the relevant portions of said beam 43 is for the purpose of reducing the incidence of the beam 43 digging into and ploughing up said concrete. The guide chains 60 also assist in this preventive action.

Switches other than the limit switches 37 may be provided in order, for example, to actuate the cleaning means if cleaning means are provided and/or to control the operation of said winches. The switches may be time-controlled or remotely controlled from a part of the pavement-laying machine.

A swinging arm boom 90 is provided in order that all of the hydraulic lines (not illustrated) may be bundled and maintained in a position in which they will not foul and be damaged by the traversing carriage.

What I claim as my invention and desire to secure by Letters Patent of the United States is:

1. Apparatus for making a textured-surface rigid road of concrete or the like, comprising a gantry adapted to span at least a portion of a newly laid plastic concrete road, means supporting said gantry on a subgrade, a frame movably supported on said gantry, a profile beam having a groove-forming working surface suspended by tension springs from said frame, said groove-forming surface having rib means extending in the direction of movement of said frame and suspended profile beam, piston means between said frame and said profile beam for raising and lowering said beam relative to the frame, a flexible connection between said piston means and said profile beam, and vibrator means directly connected to said profile beam, whereby upon actuation of said vibrator means the profile beam fluidizes the underlying concrete and molds at least one groove therein while being floatingly supported by said tension springs.

2. An apparatus as claimed in claim 1, wherein said tension springs are substantially constant force springs which floatingly support said profile beam from the frame.

3. An apparatus as claimed in claim 1, wherein said vibrator is mounted upon said profile beam.

4. An apparatus as claimed in claim 1, wherein said flexible connection between said piston and said profile beam comprises a set of links pivoted to each other at their ends and forming a parallelogram.

5. An apparatus according to claim 1, wherein said frame comprises a pair of parallel A-shaped members spaced from one another, said profile beam being suspended between said A-shaped members by said tension springs, piston means and flexible connection, and by flexible elements connecting said profile beam to the legs of said A-shaped members.

6. An apparatus as claimed in claim 1, wherein said frame is supported by a carriage movable on said gantry, and wherein a reversible motor is provided to drive said carriage at constant or varied speeds.

7. An apparatus as claimed in claim 6, wherein limit switches are provided which are tripped by the carriage when the carriage reaches the end of a respective traverse of the gantry, said limit switches being operative to stop said carriage and said vibrator means at the end of a traverse of the gantry.

8. Apparatus as claimed in claim 6, wherein said carriage is driven by said reversible motor through chains and sprockets keyed to transverse shafts carrying guide wheels whose single circumferential flanges extend into a straight guide slot.

9. Apparatus as claimed in claim 1, wherein the working surface of said profile beam consists of downwardly directed parallel ridges which between them define parallel troughs, those marginal portions of the beam which extend in directions substantially normal to the parallel ridges being canted upwardly towards said gantry so as to reduce the incidence of said marginal portions digging into and ploughing up said plastic concrete.

10. Apparatus as claimed in claim 9, wherein said ridges are of rectangular section.

11. Apparatus as claimed in claim 9, wherein at least that part of said profile beam which provides said working surface thereof is made out of a solid block of metal.

12. Apparatus as claimed in claim 1, including wheels on said gantry, power means operable to effect power-assisted travel of said apparatus in each of two alternative, opposite directions of travel.

*13. Apparatus for making a textured surface rigid road of concrete or the like, comprising a gantry adapted to span at least a portion of a newly laid plastic concrete road, means supporting said gantry on a subgrade, a frame movably supported on said gantry for movement along said gantry, a profile beam which has a groove-forming working surface and which is floatingly suspended by springs from said frame, said groove-forming surface having rib means extending in the direction of movement of said frame and suspended profile beam, means for raising and lowering said beam relative to the subgrade, a flexible connection between said frame and said profile beam, and vibrator means directly connected to said profile beam, whereby upon actuation of said vibrator means when the groove-forming surface of said profile beam is in contact with said plastic concrete the profile beam fluidizes the underlying concrete and moulds at least one groove therein while being floatingly supported by said springs.*

*14. Apparatus for making a textured surface rigid road of concrete or the like, as claimed in claim 13, wherein said springs which floatingly suspend the profile beam are tension springs.*

* * * * *